(12) United States Patent
Liang et al.

(10) Patent No.: US 9,618,043 B2
(45) Date of Patent: Apr. 11, 2017

(54) ROLLER BEARING FLANGE CONFIGURATION

(75) Inventors: Baozhu Liang, Dittelbrunn-Hambach (DE); Michael Reugels, Knetzgau (DE)

(73) Assignee: AKTIEBOLAGET SKF, Gothenburg (SE)

( * ) Notice: Subject to any disclaimer, the term of this patent is extended or adjusted under 35 U.S.C. 154(b) by 542 days.

(21) Appl. No.: 14/119,583

(22) PCT Filed: May 24, 2012

(86) PCT No.: PCT/EP2012/059735
§ 371 (c)(1),
(2), (4) Date: Dec. 16, 2014

(87) PCT Pub. No.: WO2012/160146
PCT Pub. Date: Nov. 29, 2012

(65) Prior Publication Data
US 2015/0093063 A1    Apr. 2, 2015

(30) Foreign Application Priority Data

May 24, 2011    (DE) .................. 10 2011 076 328

(51) Int. Cl.
*F16C 33/58*    (2006.01)
*F16C 19/22*    (2006.01)
*F16C 19/36*    (2006.01)

(52) U.S. Cl.
CPC .......... *F16C 33/586* (2013.01); *F16C 19/225* (2013.01); *F16C 19/364* (2013.01); *F16C 33/585* (2013.01)

(58) Field of Classification Search
CPC .......... F16C 19/22; F16C 19/34; F16C 19/36; F16C 19/361; F16C 19/364; F16C 19/225; F16C 33/34; F16C 33/36; F16C 33/366; F16C 33/58; F16C 33/583; F16C 33/585; F16C 33/586; F16C 2019/365; F16C 2019/367; F16C 2019/368
USPC ......................................................... 384/564
See application file for complete search history.

(56) References Cited

U.S. PATENT DOCUMENTS

| 6,530,693 B1* | 3/2003 | Ijuin | F16C 19/225 |
| | | | 384/450 |
| 7,416,346 B2* | 8/2008 | Takemura | F16C 19/225 |
| | | | 384/450 |
| 7,871,201 B2* | 1/2011 | Ohshima | F16C 33/36 |
| | | | 384/564 |

(Continued)

FOREIGN PATENT DOCUMENTS

DE    102008020068 A1    10/2009
JP       2008164062 A      7/2008

*Primary Examiner* — James Pilkington
(74) *Attorney, Agent, or Firm* — Bryan Peckjian; SKF USA Inc. Patent Dept.

(57) ABSTRACT

A bearing ring for a roller bearing includes a raceway configured to support at least one rolling-element roller and a flange at an end of the raceway extending away from the raceway and having an abutment surface for guiding the at least one rolling-element roller on the raceway. The abutment surface has a curvature that decreases monotonically from a starting point on the abutment surface to an end of the abutment surface, and the abutment surface includes at least one strongly monotonically decreasing segment.

8 Claims, 3 Drawing Sheets

(56) References Cited

U.S. PATENT DOCUMENTS

| | | | |
|---|---|---|---|
| 8,899,839 B2* | 12/2014 | Liang | F16C 19/225 384/564 |
| 2002/0186908 A1 | 12/2002 | Tsujimoto | |
| 2007/0041678 A1* | 2/2007 | Matsuyama | F16C 19/225 384/571 |

* cited by examiner

ROLLER BEARING FLANGE CONFIGURATION

CROSS-REFERENCE

This application is the U.S. National Stage of International Application No. PCT/EP2012/059735 filed on May 24, 2012, which claims priority to German patent application no. 10 2011 076328.7 filed on May 24, 2011.

FIELD OF THE INVENTION

The present invention relates to a geometry concept for a flange of a roller bearing, in particular for tapered roller bearings.

BACKGROUND

Guide flanges in roller bearings, such as e.g. tapered roller bearings, can be embodied either straight or spherical. Straight flanges are mainly used for roller bearings of smaller diameters and thus also smaller flange widths. In this case, a flange width is often too small to produce a defined profile on an available flange surface. Spherical flanges, i.e. flanges having a constant curvature, find application mostly in roller bearings having larger diameters and thus also having larger flange widths. A spherical flange is characterized in that a radius, which defines a flange shape facing towards a roller raceway, has its origin substantially on an axis of rotation of the rollers (roller rotational axis), wherein small deviations are allowed due to alignment errors.

For a more detailed description of roller bearings having spherical flanges, FIG. 1 shows, in a schematic representation, a longitudinal section of a roller bearing 10, which is formed in an exemplary manner as a tapered roller bearing. The roller bearing 10 includes a bearing inner ring 11, a bearing outer ring 12, and a plurality of rollers 13, which can roll on races or raceways 14, 15 formed by the inner sides of the bearing rings 11, 12. In the case of a tapered roller bearing, tapered rollers are the rollers corresponding to the rollers or rolling elements 13.

The tapered rollers 13 can roll on an inner raceway 14, which is formed in the bearing inner ring 11, and on an outer raceway 15, which is formed in the bearing outer ring 12. In a tapered roller bearing, the raceways 14, 15 are formed as conical outer surfaces. In the longitudinal section shown in FIG. 1 of the tapered roller bearing 10, the raceways 14, 15 define, in an imaginary extension, an inner line 16 and an outer line 17, which meet on an axis of rotation 18 of the roller bearing 10 ideally at a center of rotation 19.

During operation of the bearing 10, each (tapered) roller 13 rotates around its own roller axis 20, wherein an imaginary extension of the roller axis 20 ideally also intersects with the center of rotation 19. For the tapered rollers 13, a rolling condition on the raceways 14, 15 is realized by a relative position of the inner line 16, outer line 17, bearing axis of rotation 18, and roller axis 20, which all intersect in the center of rotation 19, so that during a relative rotation of bearing inner ring 11 and bearing outer ring 12, the tapered rollers 13 roll on the raceways 14, 15 substantially without slippage, and an amount of friction related thereto is minimized.

When supporting axial forces, in order to also optimize the friction that occurs in the axial direction i.e. in the direction of the bearing rotational axis 18, the rollers 13 used in roller bearings can have a first curvature, on their end side 21, identified by a first radius R21, so that a part of a ball surface results as an end side surface of the rollers 13, which, as is indicated in the enlargement of FIG. 1, is in contact at a contact point 22 with a straight- or spherically-embodied flange 23, for example of the bearing inner ring 11. Away from the region of a possible contact point 22, the curved end side can also have a second curvature defined by a second radius R23, which curvature is less than the first curvature of the spherical end side surface 21 of the rollers 13. In this region the rollers can also be flat. Curvature is generally understood to mean the change in direction per traversed length of an infinitesimally short curved piece. A circle having the radius r thus has the same, constant curvature 1/r everywhere; its direction changes everywhere equally strongly. With all other curves the curvature can vary from curve point to curve point, or along a path on the one three-dimensional surface. The inverse of the curvature is referred to as the radius of curvature. This is the radius of that circle (circle of curvature) which represents the best approximation of the observed curve in the vicinity of the contact point.

In roller bearings, such as for example cylindrical roller-, barrel roller-, or ball-bearings, which are designed with straight or flat flanges, in comparison to spherically embodied flanges the roller-flange contact has a higher surface pressure (Hertzian pressure) between the roller end side 21 and the flange surface facing towards this. Here the Hertzian pressure is understood to be the greatest pressure that prevails in the middle of the contact surface of two elastic bodies. If, such as with roller bearings having straight flanges, two elastic bodies (curved roller end side and straight or flat flange) are pressed against each other, then in the ideal case they touch only in a punctiform manner. However, in the real case, a flattening and thus a contact surface arises at the contact point 22 due to the elasticity. A characteristic pressure distribution (surface pressure) arises on the contact surface in both bodies, wherein the pressure is always highest in the middle. If, as here, a ball outer surface and a flat flange surface touch, a touch- or contact-ellipse results. Due to the comparatively high surface pressure, with roller bearings having straight flanges, a relatively poor lubricant film formation generally results at higher effective forces. In addition, in comparison to spherical flanges, straight or flat flanges lead to smaller contact ellipses between the roller end side and the flange surface facing this, for which reason an overlapping of the contact ellipse with the flange edges can result only at extreme loads. Likewise, with straight- or flat-embodied flanges, there is a low sensitivity of the contact point 22 to alignment errors, so that a defined contact point 22 between roller 13 and flange is possible. While on the one hand a greater skewing of the roller 13 is made possible with flat-embodied flanges, on the other hand a relatively poor guiding of the rollers results during operation.

Tapered roller bearings in the large bearing field can, as shown with reference to FIG. 1, be embodied with spherical flanges 23, which compared to straight or flat flanges results in a lower surface pressure between the roller end side 21 and the flange surface or abutment surface facing towards the roller 13 as a consequence. In addition, spherically-designed flanges 23 lead, compared to straight flanges, to larger contact ellipses between the roller end side 21 and the opposing flange surface, so that overlappings of the contact ellipse with the flange edges and thus edge stresses can frequently result. In general, with spherically-designed flanges 23 there is a higher sensitivity of the contact point 22 to alignment errors than is the case with flat- or straight-embodied flanges. Although on the one hand spherical flanges have a lower skewing of the roller 13 as a consequence, on the other hand due to the narrow osculation between the roller end side 21 and the flange surface facing towards roller 13, the roller 13 can be guided better during operation. A defined contact point 22 between the roller 13 and the flange 23 is also theoretically possible with spherical flanges by a different choice of the radii of curvature (and/or their origins) of roller end surface 21 and spherical flange surface.

However, one of the main disadvantages of a spherical flange is the resulting sensitivity of the contact point 22 between the roller end side 21 and the flange 23 to alignment error. Deviations in the raceway angle, roller angle, flange radius, as well as roller end side radius have a decisive influence thereon.

SUMMARY

The object of the present invention is to provide an improved flange geometry which reduces the above disadvantages.

In order to achieve this, an appropriately optimized flange surface geometry is proposed herein, in particular a specific geometry of an abutment surface of the flange, which faces towards the raceway, with which abutment surface the rollers can come into contact.

In particular, the flange has an abutment surface, facing towards the raceway, for rolling-element rollers or rollers, the curvature of which abutment surface decreases monotonically from a starting point up to an end of the abutment surface.

In this way a low Hertzian pressure is on the one hand ensured by the curved surface, while the risk of an overlapping of the rolling element with the flange edge can simultaneously be minimized by the reduction of the curvature up to the end of the abutment surface.

For this, some exemplary embodiments of the invention provide a bearing ring for a roller bearing having a raceway for at least one roller, which has an at least partially spherically formed roller end surface. For transferring axial forces, the bearing ring has a flange disposed on the raceway or adjacent thereto, which flange has an abutment surface facing towards the roller end side, the curvature of which decreases monotonically from a starting point within the abutment surface up to an end of the abutment surface. In some exemplary embodiments, the flange or the abutment surface extends away from the raceway in a direction substantially perpendicular to the raceway. It is, for example, to be understood that the flange or the abutment surface extends away from the raceway such that a roller or a roller body can be prevented, by contact with the abutment surface, from moving parallel to the raceway.

In some exemplary embodiments, the starting point is disposed at an inner end of the abutment surface, which inner end is adjacent to the raceway, which can achieve the maximum compensation of skewing in one direction. The starting point can thus lie adjacent to a flange edge or groove edge.

In further exemplary embodiments, the starting point is disposed between an inner end of the abutment surface, which inner end is adjacent to the raceway, and an outer end of the abutment surface, which outer end faces away from the raceway, wherein the curvature of the raceway decreases monotonically from the starting point towards both ends of the raceway. This can compensate for a skewing of the bearing in two different directions.

In some exemplary embodiments, the roller-flange geometry can be designed such that for an ideal geometry the contact point or contact region between the roller end side and the abutment surface lies at the starting point.

In some exemplary embodiments, the curvature decreases strongly monotonically from the starting point to the respective end of the raceway, which can ensure a large-as-possible contact ellipse for each point on the abutment surface.

In some further exemplary embodiments, the monotonic curvature is such that within a first region comprising the starting point, the curvature decreases monotonically or strongly monotonically, wherein in a second region lying between the first region and the end of the abutment surface, the curvature is constant or 0. In the second region, the abutment surface can thus for example be flat and have the curvature 0.

According to some exemplary embodiments the roller bearing is a tapered roller bearing. The roller is then accordingly formed as a tapered roller.

Further advantageous designs and further developments are the subject matter of the dependent claims.

BRIEF DESCRIPTION OF THE DRAWINGS

Exemplary embodiments of the present invention are explained in more detail below with reference to the accompanying figures:

FIG. 2 shows, in a schematic longitudinal section, a section of a roller bearing according to an exemplary embodiment of the present invention.

DETAILED DESCRIPTION

Figure 1:
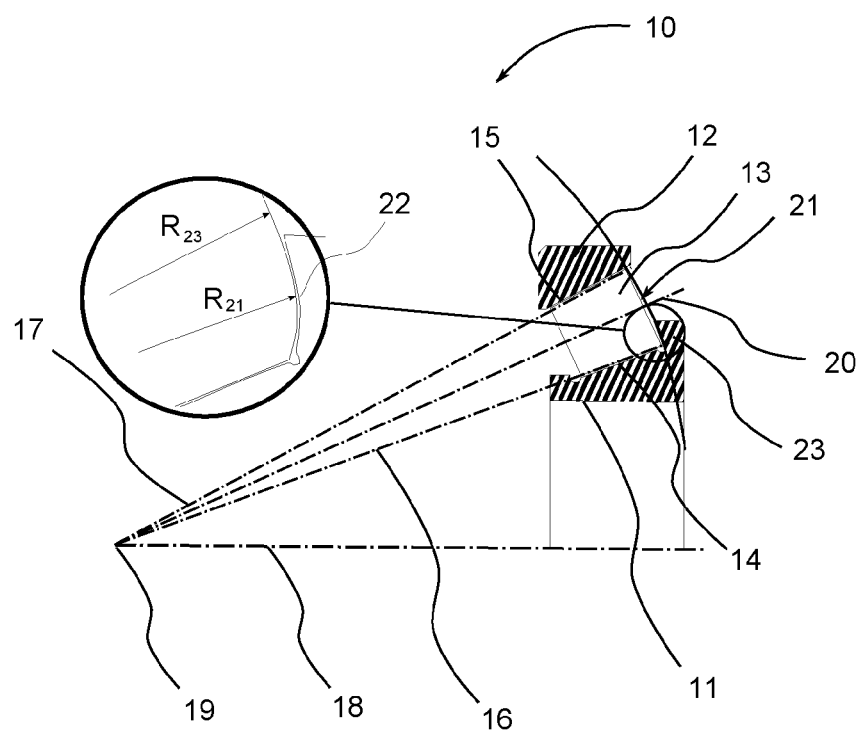
FIG. 1 shows a schematic longitudinal section through a roller bearing having spherical flanges.

A part of a bearing ring 30 for the roller bearing having a raceway 14 for at least one roller 13 is depicted. The roller 13 has a curved roller end surface 21, which can be e.g. at least partially spherical. The bearing ring 30 has a flange 31 for transferring axial forces, which flange 31 is disposed in an end-sided manner toward or at the end side of the roller 13 and the raceway 14; the flange 31 has a flange surface 32 facing towards the roller end surface and thus also towards the raceway 14.

Figure 2:
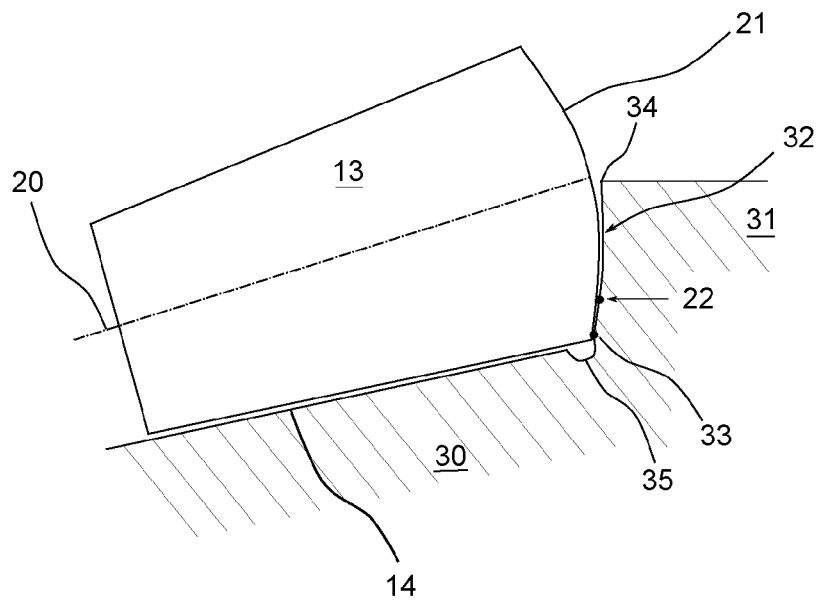
FIG. 2 shows a schematic longitudinal section through a roller bearing having a bearing ring according to an exemplary embodiment of the present invention.
Figure 3:
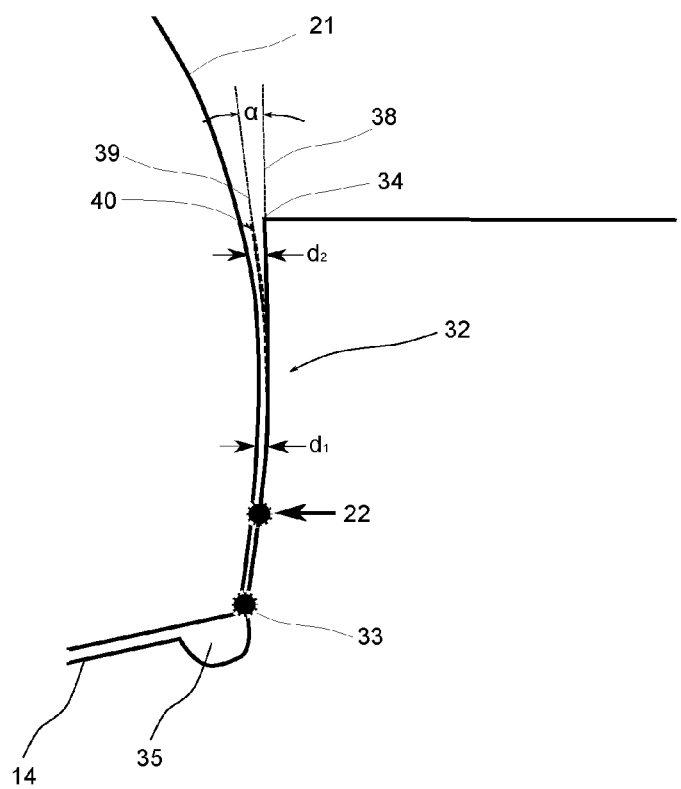
FIG. 3 shows an enlarged representation of the roller-flange contact region according to FIG. 2.

As depicted in the enlarged view of FIG. 3 in addition to FIG. 2, if the contact between roller 13 and abutment surface 32 exists at the illustrated contact point 22, a curvature of the abutment surface 32, which faces towards the raceway 14, for rolling-element rollers decreases strongly monotonically from the starting point 33 on the abutment surface 32, which starting point 33 is adjacent to the raceway, up to an end 34 of the abutment surface so that, e.g., a gap size d2 between the roller 13 and the abutment surface 32 is larger than a gap size d1. In other words, the starting point 33 is a point of maximum curvature on the abutment surface 32.

As was already mentioned, the curvature shall be understood in this case to mean a change of direction per unit length. As a measure for a sign-independent direction change, the curvature is positive or zero. The curvature e.g. of a straight line is everywhere equal to zero, since its direction does not change. A circle having a radius r has the same curvature everywhere (namely 1/r), since its direction changes everywhere equally strongly. With all other curves the curvature changes from curve point to curve point. The curvature of a curve at a point thus indicates how strongly the curve deviates, in the immediate vicinity of the point, from a straight line. A measure for the curvature of a curved surface, such as for example the abutment surface 32, can for example also be the increasing deviation of the surface from a plane tangential to the surface at a given point. A stronger curvature makes itself noticeable as a stronger deviation from the plane. A monotonically decreasing curvature thus means that if one moves along a locus curve along a surface, with each infinitesimal step along the locus curve the curvature either is smaller or remains the same. A strongly-monotonically-decreasing curvature correspondingly means that with each infinitesimal step the curvature along the locus curve is smaller.

In the exemplary embodiment illustrated in FIGS. 2 and 3, the starting point 33 is located directly on a groove 35 between the raceway 14 and the abutment surface 32, i.e. on the inner end of the abutment surface 32, which end is adjacent to the raceway 14. The curvature thus decreases monotonically from the starting point up to an outer end 34 of the abutment surface 32, which outer end faces away from the raceway.

According to some exemplary embodiments, the monotonically- or strongly-monotonically-decreasing curvature of the abutment surface 32 makes possible an opening of the flange 31 or the abutment surface 32 in an angular range a from greater than 0° up to 30°, preferably in a range 0° 0' 6"≤α≤30°.

The opening a of the abutment surface 32 can be defined for example by determining the angle between a tangential plane 38 at the end of the abutment surface 34 and a second tangential plane 39 on a spherical surface 40 that extends from the starting point 33 up to the end of the abutment surface 34, the curvature of which spherical surface 40 corresponds to the curvature at the starting point 33. In some exemplary embodiments this angle falls in a range from greater than 0° up to 30°.

After exemplary embodiments have been described with reference to FIGS. 2 and 3, wherein the starting point 33 is disposed on the lower region of the flange 31 (adjacent to the flange edge/groove edge 35), a further exemplary embodiment will be described in the following with reference to FIG. 4, wherein the starting point 33 is not adjacent to the groove 35 but rather is disposed between an inner end 36 of the abutment surface, which end 36 is adjacent to the raceway, and an outer end 34 of the abutment surface, which end 34 faces away from the raceway. The curvature of the abutment surface 32 thereby decreases monotonically or strongly monotonically, or reduces monotonically or strongly monotonically, from the starting point 33 to both ends of the raceway.

Figure 4:
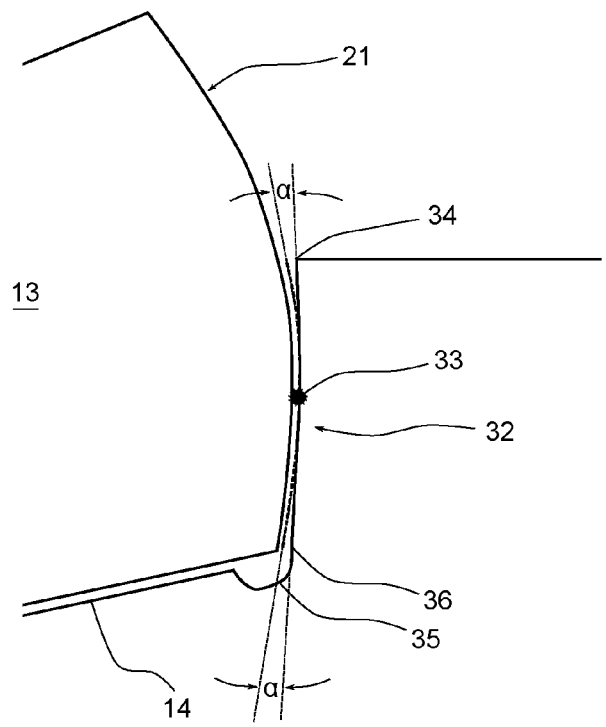
FIG. 4 shows a schematic longitudinal section through a roller bearing having a bearing ring according to a further exemplary embodiment of the present invention.

In the exemplary embodiment shown in FIG. 4, the roller-flange contact geometry can be chosen such that the contact point 22 lies in the region of the starting point 33. With respect to the opening of the abutment surface towards its ends, said equivalent with respect to FIG. 3 applies, i.e. the angle α defining the opening can fall between approximately 0° 0' 6" and 30°.

Figure 5:
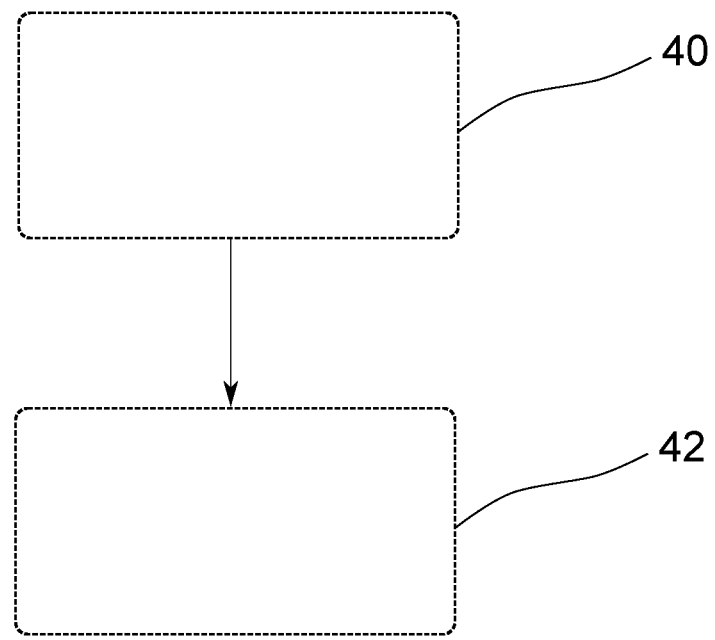
FIG. 5 shows a schematic flow diagram for an exemplary embodiment of a manufacturing process for a bearing ring.

For the sake of completeness, an exemplary embodiment of a manufacturing method for manufacturing a bearing ring for a roller bearing having a raceway for at least one roller will now be explained with reference to FIG. 5.

In a preparation step 41, a flange for transferring axial forces is provided, which flange is disposed on an end side of the raceway, which flange extends away from the raceway in a direction substantially perpendicular to the raceway.

In an optimization step 42, an abutment surface for rolling-element rollers on the flange is produced, which abutment surface faces towards the raceway, wherein the curvature of the abutment surface decreases monotonically from a starting point up to an end of the abutment surface.

In summary, the proposed flange shape is suited to reduce the sensitivity of the roller-flange contact point to alignment errors and skewing of the bearing in use, but nevertheless to be able to ensure a sufficient guiding of the roller on the raceway during operation. The inventive flange geometry ensures a good roller guiding with low Hertzian pressure, as well as a low risk for edge overlaps and the undesirable edge stresses resulting therefrom.

In other words, the inventive flange geometry has the following advantageous features:

- The roller guiding during operation is preserved due to the curved abutment surface 32,
- Low Hertzian pressure due to the curved abutment surface 32,
- The curvature of the abutment surface 32 decreasing to the end reduces the size of the contact ellipse in comparison with purely spherical flanges, whereby an overlapping of the contact ellipse with the flange edges is avoided,
- Due to the curvature of the abutment surface 32 that decreases to the end, there is a lower sensitivity of the location of the contact point 22 between the roller end side 21 and the abutment surface 32 with respect to alignment errors,
- A defined contact point 22 between the roller 13 and the abutment surface 32 is possible.

The proposed roller-flange geometry is designed such that the contact point can lie near the starting point 33 between the roller end side and the flange. If the contact point 22 shifts due to alignment errors towards the ends of the abutment surface 32, then the sensitivity is greatly reduced, which can prevent a "wandering" of the theoretical contact point out over the flange edge and thus can also prevent high edge pressures.

Although the present invention has been described with reference to an embodiment having tapered roller bearings and tapered rollers, exemplary embodiments are not limited to such designs. In principle, the present invention can also be applied to other rollers and roller bearings, such as e.g. to cylindrical and barrel roller bearings.

REFERENCE NUMBER LIST

10 Roller bearing
11 Bearing inner ring
12 Bearing outer ring
13 Roller
14 Inner roller raceway
15 Outer roller raceway
16 Inner straight line
17 Outer straight line
18 Bearing axis of rotation
19 Center of rotation
20 Roller axis
21 Roller end side
22 Contact point 23 Spherical flange
30 Part of a bearing ring
31 Flange of a bearing ring
32 Abutment surface
33 Starting point
34 Outer end of the abutment surface
35 Groove
36 Inner end of the abutment surface
38 Tangential plane
39 Second tangential plane
40 Spherical surface
41 Preparation step
42 Optimization step

The invention claimed is:

1. A bearing ring for a roller bearing, comprising a raceway for at least one rolling-element roller, and a flange for transmitting axial forces, such that the flange is disposed on an end side of the raceway and extends away from the raceway and has an abutment surface for the at least one rolling-element roller, such that the abutment surface faces towards the raceway and includes a curvature that decreases monotonically from a starting point up to an end of the abutment surface and has at least one segment having a second curvature closer to the starting point that has a greater degree of curvature than a first curvature that is further from the starting point than the second curvature, wherein an angle between a tangential plane at the end of the abutment surface and a second tangential plane on a curved surface of the curvature at the starting point, falls within a range greater than 0 degrees and up to 30 degrees.

2. The bearing ring according to claim 1, wherein the starting point is disposed between an inner end of the abutment surface, the inner end being adjacent to the raceway, and an outer end of the abutment surface, the outer end extending away from the raceway, and the curvature of the abutment surface decreases monotonically from the starting point towards both ends of the abutment surface.

3. The bearing ring according to claim 1, wherein the starting point is disposed on an inner end of the abutment surface, the inner end is adjacent to the raceway.

4. The bearing ring according to claim 1, wherein the roller bearing is a tapered rolling bearing for use with a tapered roller.

5. The bearing ring according to claim 1, wherein the bearing ring is a bearing inner ring.

6. A roller bearing including a bearing inner ring according to claim 1, and including at least one tapered roller.

7. A roller bearing according to claim 6, wherein the at least one tapered roller has, on its surface portion facing towards the abutment surface, a curved surface having a constant curvature.

8. A method for manufacturing a bearing ring for a roller bearing including a raceway for at least one rolling-element roller, comprising:
providing a flange for transmitting axial forces, such that the flange is disposed on an end side of the raceway and extends away from the raceway; and
producing an abutment surface, which faces away from the raceway, for rolling-element rollers on the flange, wherein the curvature of the abutment surface decreases monotonically from a starting point to an end of the abutment surface and has at least one segment having a second curvature closer to the starting point having a greater degree of curvature than a first curvature that is further from the starting point than the second curvature, wherein an angle between a tangential plane at the end of the abutment surface and a second tangential plane on a curved surface of the curvature at the starting point, falls within a range greater than 0 degrees and up to 30 degrees, wherein the roller bearing is a tapered rolling bearing, and wherein the bearing ring is a bearing inner ring.

* * * * *